United States Patent [19]
Wosser, Jr.

[11] 3,794,094
[45] Feb. 26, 1974

[54] METHOD AND APPARATUS FOR STORING AND ATTACHING TIRE CHAINS

[76] Inventor: Joseph L. Wosser, Jr., 1855 Sierra Sage Ln., Reno, Nev. 89502

[22] Filed: Aug. 11, 1972

[21] Appl. No.: 279,851

[52] U.S. Cl. .............................................. 152/213
[51] Int. Cl. ........................................... B60c 27/02
[58] Field of Search... 152/213, 214, 215, 233, 241, 152/242

[56] References Cited
UNITED STATES PATENTS

| | | | |
|---|---|---|---|
| 1,657,848 | 1/1928 | Vordemfelde | 152/215 |
| 2,217,498 | 10/1940 | Shepherd et al. | 152/213 |
| 2,255,178 | 9/1941 | Machain | 152/214 |
| 2,130,293 | 9/1938 | Bonforte | 152/213 |

*Primary Examiner*—James B. Marbert
*Attorney, Agent, or Firm*—Miketta, Glenny, Poms & Smith

[57] ABSTRACT

A system for storing and attaching a tire chain to a vehicle wheel is provided in which each chain is stored in a spring clip carrier constructed to receive and removably hold each of the cross chains which extend at spaced intervals between a pair of sidewall chains of the tire chain. The carrier has a relatively flat elongate shape, open at one end to receive the cross chains and is provided with a slight longitudinally arcuate configuration for conforming to the outer circumference of the tire. Installation is initiated by anchoring the end of the tire chain adjacent an open end of the spring clip carrier to the ground engaged portion of the tire by means of a special cross chain fitting. A crank tool of special construction is employed to impel the carrier around the tire circumference while it is slidably engaged with tread surfaces such that each of the retained cross chains and attached sidewall chains are released by the carrier and disposed in place around the tire circumference. Additional specially formed fitting means are provided for connecting associated ends of the sidewall chains and thus securing the tire chain in place.

11 Claims, 10 Drawing Figures

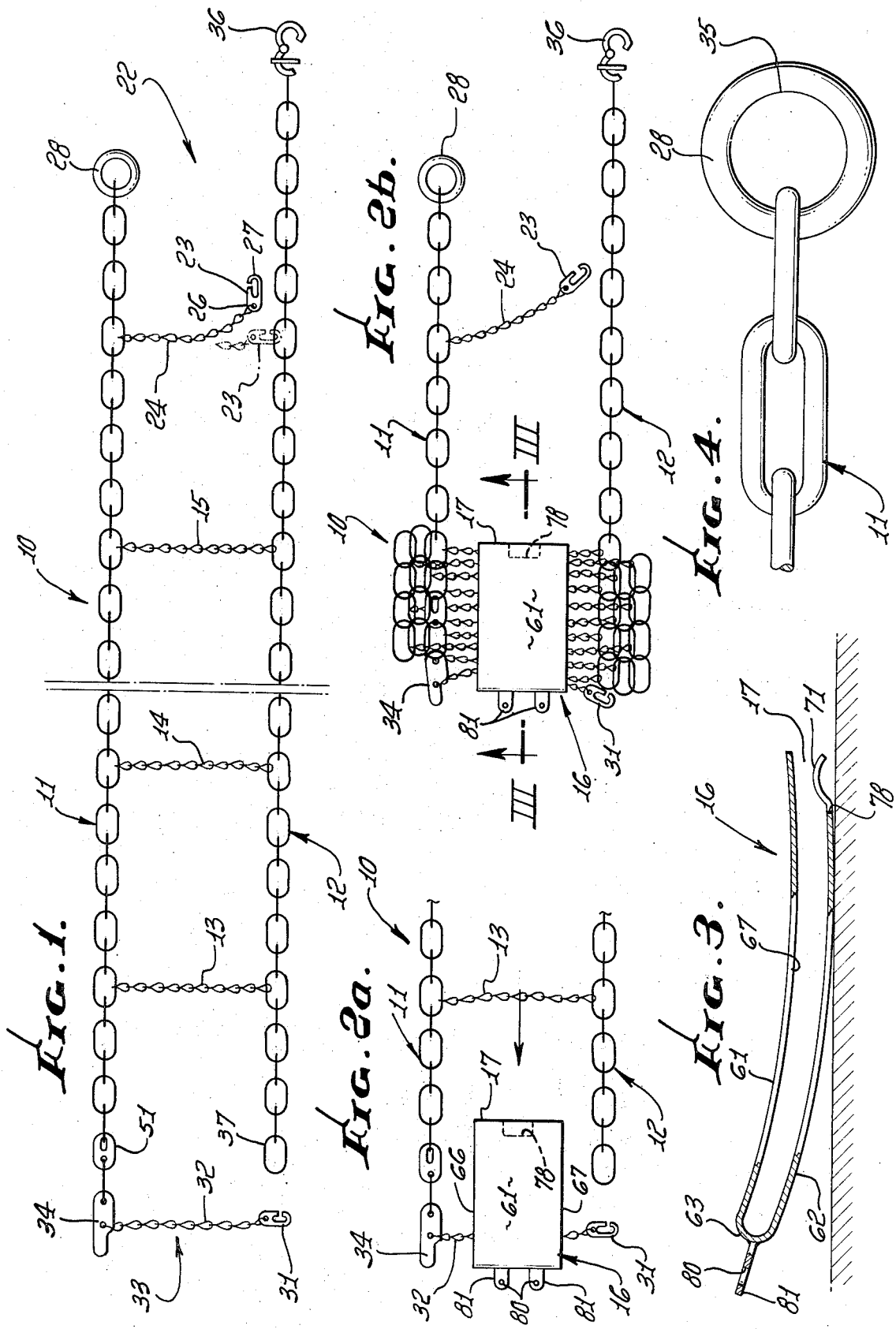

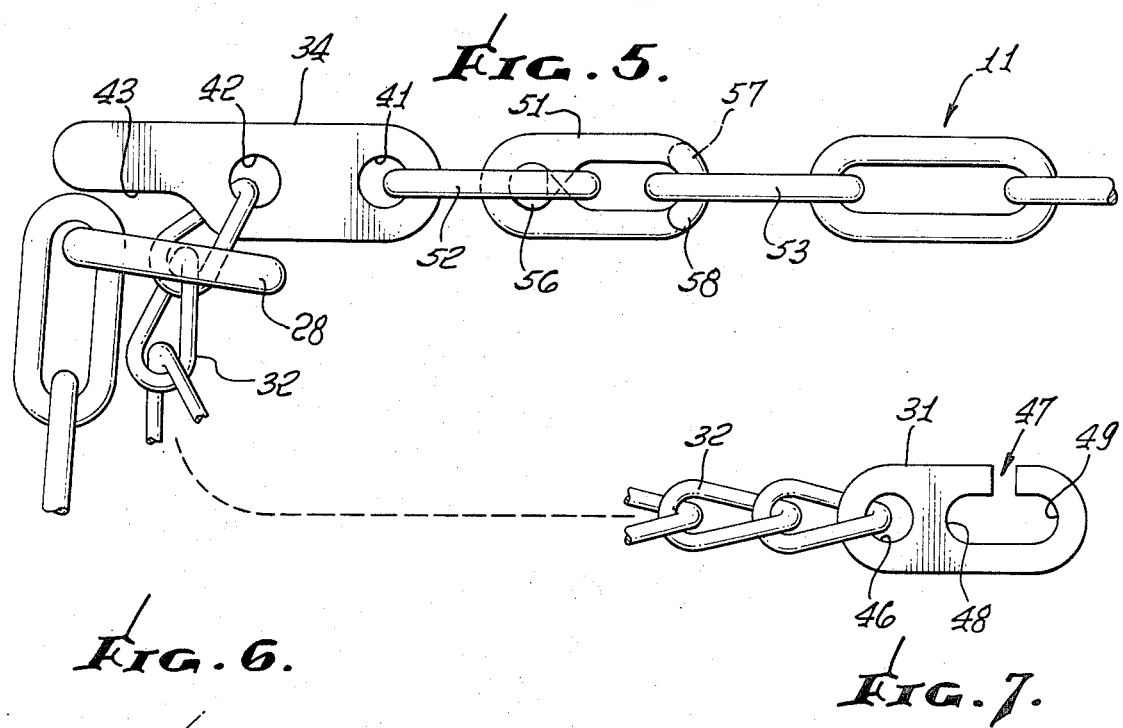
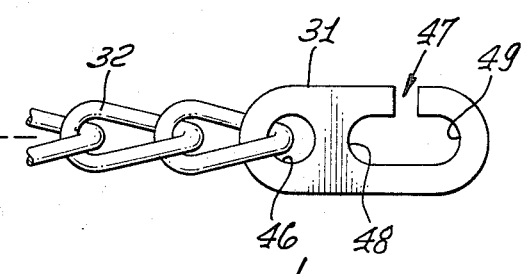
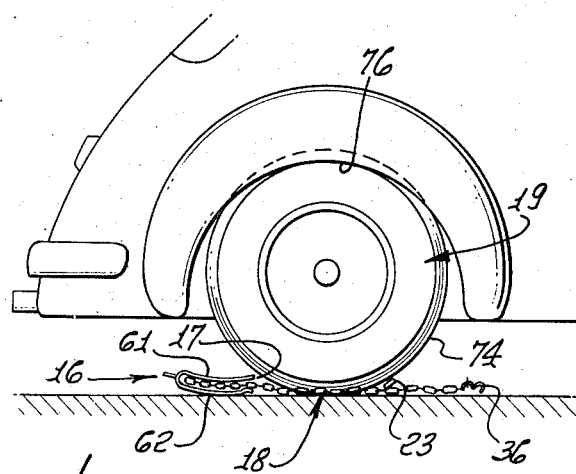
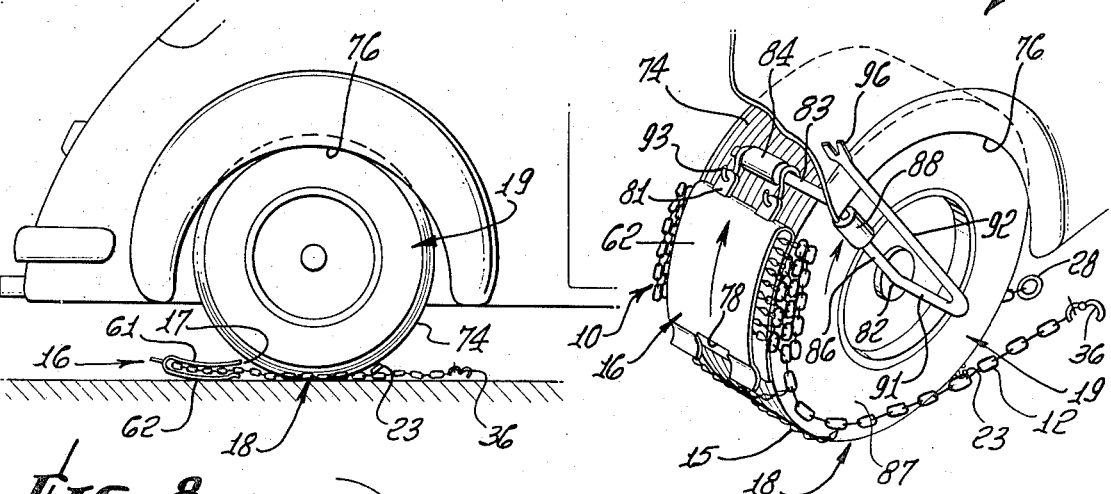
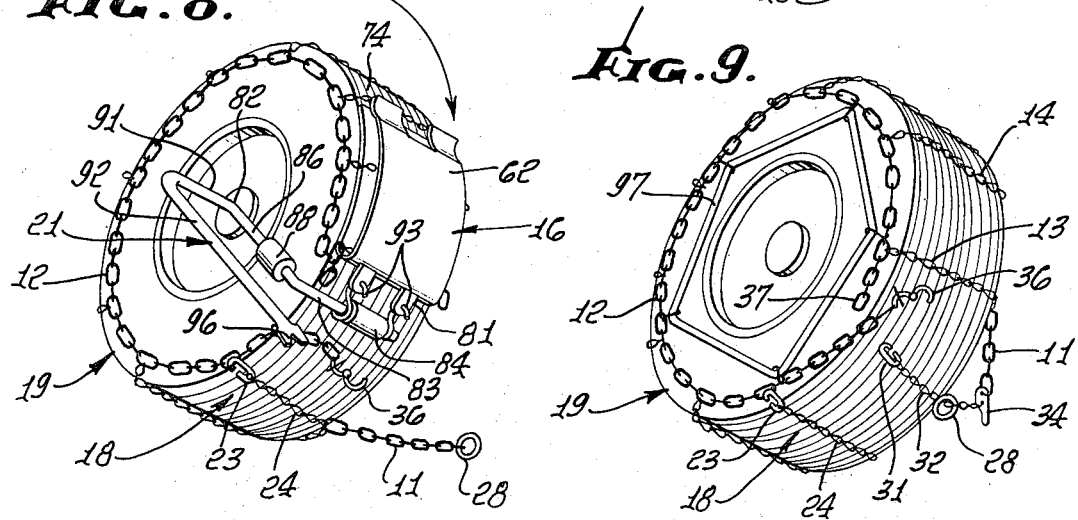

METHOD AND APPARATUS FOR STORING AND ATTACHING TIRE CHAINS

BACKGROUND OF THE INVENTION

In general the present invention relates to snow and ice tire chains and in particular to a tire chain system for storing the chains when not in use and for facilitating attachment of the chains to a vehicle wheel or tire.

Notwithstanding previous attempts to improve and facilitate the installation of snow and ice tire chains, such installation with existing practices remains a time consuming, difficult and many times dangerous effort.

SUMMARY OF THE INVENTION AND ITS OBJECTIVES

Accordingly, it is an object of the present invention to provide an improved method and apparatus for facilitating the mounting of tire chains on a vehicle tire. Moreover, the present invention is to provide such installation without jacking of the vehicle, moving the vehicle or requiring the user to get under the vehicle and thereby expose himself to possibly injury.

It is another object of the present invention to provide a tire chain system which as above facilitates the mounting of the chains on a vehicle wheel and also provides for conveniently storing the tire chains when not in use.

It is still another object of the present invention to provide apparatus and method for mounting tire chains which is particularly suited for a vehicle in which the upper portion of the circumference of the tire thereof is closely surrounded by a fender.

These objects are achieved in accordance with the tire chain system of the present invention by a tire chain including standard inner and outer sidewall chains connected together at longitudinal intervals by cross chains and modified by the present invention to comprise special fittings that connect certain of the chain elements. This tire chain including the special fittings is stored in a relatively flat, slightly accurate spring clip carrier which receives and releasably retains each of the cross chains with the sidewall chains depending in bunched fashion therefrom.

During mounting, the end of the tire chair adjacent an open end of the carrier is anchored to the grounded portion of the vehicle tire by means of special fittings and a specially formed crank tool is employed in cooperation with the spring clap carrier for impelling the carrier circumferentially around the tire tread. As the carrier moves around the tire, each of the cross chains and adjacent protions of the sidewall chains are released to assume a properly placed disposition about the tire circumference. Additional special fitting means are provided for connecting opposite ends of the sidewall chains wherein such special fittings include a provision for one of the cross chains.

Although the present invention will be described for use with a standard automobile tire, it will be appreciated that the structure and methods employed are easily adapted for use with other vehicles, such as buses, trucks and tractors. In addition, while the mounting instructions herein correspond to a rear traction tire installation, it will be understood that the chain system of the present invention can also be used for front traction tires or in any other position on a multi-wheeled vehicle.

These and further objects and various advantages of the method and apparatus for storing and attaching tire chains according to the present invention will become apparent to those skilled in the art from a consideration of following detailed description of one particular and exemplary embodiment thereof. Reference will be made to the appended sheets of drawings in which:

BRIEF DESCRIPTION OF DRAWINGS

FIG. 1 is a plan view of a tire chain with central portions thereof removed in order to show the special fittings at the tire chain ends in accordance with the present invention.

FIGS. 2a and 2b are also plan views illustrating at different stages, the manner in which the tire chain is stored within a spring clip carrier of the present invention.

FIG. 3 is a cross-section view of the spring clip carrier taken along section lines III—III of FIG. 2b, however here with the tire chain removed from the carrier.

FIG. 4 is an enlarged fragmentary view showing one of the ends of the inner sidewall chain including a special ring fitting of the present invention.

FIG. 5 is an enlarged fragmentary view showing the opposite end of the inner sidewall chain from the ring fitting including a special fitting plate and a terminal cross chain section for cooperating with the special ring fitting of FIG. 4.

FIG. 6 is a pictorial side elevation view illustrating the chain system of the present invention as it is arranged relative to the tire of a vehicle for initiating mounting of the tire chain thereon.

FIG. 7 is a fragmentary perspective view of the tire chain system and the tire of FIG. 6 in which the fender is partially cut away to illustrate the manner in which the tire chain is dispensed by the spring clip carrier about the circumference of the vehicle tire.

FIG. 8 is another fragmentary perspective view showing the installation of the tire chain in accordance with the invention at a later stage in the operation.

FIG. 9 is further perspective view of the tire chain and tire illustrating the arrangement of the tire chain just prior to completion of the installation.

DESCRIPTION OF THE PREFERRED EMBODIMENT

With reference to the drawings, the tire chain system in accordance with the present invention provides for storing and attaching a tire chain 10 of the type including inner and outer sidewall chains 11 and 12 respectively, connected together at longitudinal intervals by transversely extending cross chains, such as cross chains 13, 14 and 15 as shown in FIG. 1. The sidewall and cross chains as such are conventional. However, in accordance with the present invention, certain special fittings described more particularly herein are provided at the ends of the sidewall chains and at certain of the cross chains to facilitate the mounting of the chains relative to a vehicle tire. For this purpose and in accordance with the present invention, a spring clip carrier 16 is provided as best shown in FIGS. 2a, 2b and 3, for storing chain 10 and providing a means for properly placing the tire chain about the tire circumference without moving or jacking the vehicle.

For storing, the cross chains are successively disposed within the spring clip carrier through an open end 17 thereof provided with means for receiving and releasably retaining each of the cross chains, wherein such storing operation is generally depicted in FIGS. 2a and 2b. For mounting, carrier 16 with the tire chain stored therein is disposed as shown in FIG. 6 with the open end 17 adjacent a ground engaged portion 18 of the vehicle tire 19 and with carrier 16 generally aligned with the tire path. The special fitting means provided at the end of the sidewall chains 11 and 12 adjacent opening 17 of the carrier are adapted to anchor this end of the tire chain to the ground engaged portion 18 of tire 10 as shown in FIG. 7. Thereupon, a crank tool 21 as shown in FIGS. 7 and 8 is arranged relative to the car wheel and is connected to an end of carrier 16 opposite open end 17 and manipulated to pull or impel the carrier circumferentially around the tire tread. As the spring clip carrier is thus circumferentially pulled or impelled with the open end 17 thereof trailing, each of the cross chains is sequentially released and the tire chain is neatly draped in place around the tire circumference. Additional special fitting means at the opposite end of the tire chain, that is the end insertee in carrier 16 first, provide easily manipulated means for connecting associated ends of the sidewall chains and for attaching a final cross chain of the linkage to complete the installation.

With particular reference to FIG. 1, conventional straight link machine chain may be employed for the non-terminal sections of sidewall chains 11 and 12. Similarly, conventional twist link machine chain may be used for the various cross chains, such as cross chains 13, 14 and 15, with the cross chains dimensioned to dispose the sidewall chains slightly up the sidewall on both the inside and outside of the tire.

With reference to a first end 22 of tire chain 10 shown in FIG. 1, the present invention provides for special fitting means affixed to the otherwise conventional sidewall and cross chain linkage. First, a cross chain 24 closest to end 22 is provided with an attaching-detaching fitting 23 permanently connected to an end thereof for detachable connection to outer sidewall chain 12 as illustrated in phantom. The other end of cross chain 24 is permanently affixed to the inner sidewall chain 11. As will be described more fully herein, this special fitting provides for anchoring end 22 of the tire chain to the ground engaged portion 18 of the vehicle tire 19 during an initial stage of installation.

Fitting 23 may be formed of stamped steel having a closed loop end 26 permanently attached to a terminal link of cross chain 24 and an open loop end 27 for detachable connection to one of the machine links of chain 21. For this purpose fitting 23 is formed with a deep recess for secure attachment yet easy hook-up. An identical attaching-detaching fitting 31 is employed at the other ene of the tire chain and is shown in an enlarged view in FIG. 5.

At the terminal link of inner sidewall chain 11 at end 22, a special ring fitting 28 is permanently affixed to provide a slip ring loop through which an attaching-detaching fitting 31 and associated cross chain 32 at the opposite end 33 of the tire chain may freely pass. The cooperation between ring fitting 28, fitting 31, cross chain 32 and a special fitting plate 34 to which cross chain 32 is fastened, provides for connecting opposite ends of inner sidewall chain 11 and for positioning cross chain 32. Ring fitting 28 may be made of 3/16 inch high test steel and may be welded closed at 35 to be permently affixed to the terminal link of chain 11. Depending on the tire size, ring fitting 28 should be disposed approximately 4 to 8 links from the point of attachment of the final cross chain 24.

At end 22 of tire chain 10, outer sidewall chain 12 is provided with a standard closing loop fitting 36 connected at a point one or more links beyond the corresponding point of connection of ring fitting 28 to the final link of inner sidewall chain 11 as shown. Fitting 36 thus provides for connection to a terminal link 37 at end 33 to close the loop formed by outer sidewall chain 12 around the tire.

Special fitting plate 34 is disposed at the end 33 of inenr sidewall chain 11 and is shaped and connected to cross chain 32 so as to abut ring fitting 28 and thereby position cross chain 32. In particular fitting 34 may be stamped from three thirty-seconds inch carbon steel plate and is generally elongate. At one end, a closed loop or opening 41 provides for connection to the end of inner sidewall chain 11 while a second closed loop or opening 42 centrally located of the elongated plate 34 provides means for connection to a terminal link of cross chain 32. A side edge portion plate 34 adjacent the end thereof opposite opening 41 is partially cut away to define an indented edge 43 cooperatively engaging ring fitting 28 when drawn up snug against the body of special plate fitting 34 as shown in FIG. 5. The opposite end of cross chain 32 extends as described to the special attaching-detaching fitting 31. As best shown in FIG. 5, fitting 31 as in the case of fitting 23 is formed with a closed loop or opening 46 at one end for joining the cross chain 31 and at the other end with an open loop 47 having deep recesses 48 and 49 aligned with the load bearing portions thereof.

An adjustment link 51 connected by machine link 52 to opening 41 of plate 34 and by machine link 53 to the main body of inner sidewall chain 11 serves to vary the length of inner sidewall chain to match the length of the outer sidewall chain, tha latter of which is determined by the tire size. Link 51 is formed of an elongated rod member bent about a rivet 56 at one end and having over lapping half rod ends 57 and 58 at the other end. Ends 57 and 58 are initally open to receive links 52 and 53 and thereafter closed to semi-permanently secure these links together. Positioning of adjustment link 51 will become fixed after an initial installation during which the chains are fitted to a particular tire size.

With reference to FIGS. 2a, 2b and 3, spring clip carrier 16 for tire chain 10 is preferably formed by folding an elongated rectangular sheet of sring steel, or other material of suitable strength and durability, lengthwise substantially in half to define a pair of spaced parallel leaves 61 and 62. These leaves are connected at the closed end 63, along the fold, and open along opposite lateral sides 66 and 67 and unconnected at the ends opposite close end 63 to define open end 17. A construction at open end 17 is provided, herein the form of boss 71 provided by a deformed end portion of leaf 62 extending toward leaf 61, to serve in conjunction with the resiliency in the spacing between leaves 61 and 62 at their unconnected ends as a resilient retainer means for receiving and releasably retaining each of the cross chains.

Preferably, the carrier is provided with a flattened low profile configuration adapted to circumferentially slide or glide over the tire tread as shown in FIGS. 7 and 8 by providing leaves 61 and 62 with a slight longitudinal arcuate configuration as best shown in FIG. 3. In particular, leaf 61 forms a bottom leaf (although shown in FIG. 3 on top) which is longitudinally concaved on exterior surface thereof for generally conforming to and slidably engaging the circumferentially curved tread surface 74 of tire 19 as shown in FIGS. 6 and 7. Similarly, leaf 62 will be referred to as the top leaf (although shown in FIG. 3 on the bottom) and is longitudinally convex on its exterior surface so as to maintain its spaced parallelism with respect to bottom leaf 61. together leaves 61 and 62 define a relatively flat, slightly arcuate low profile body which when arranged as described conveniently slides around the tire circumference as shown in FIG. 7 with top leaf 62 clearing the surrounding fender 76 of the vehicle.

As examples of dimensions, I have found that a spring clip carrier 16 formed with an inside spacing between leaves 61 and 62 of approximately six-tenths of an inch holds standard cross chains snuggly. This presents a thickness between the exterior surfaces of leaves 61 and 62 of less than three-fourths of an inch which provides adequate clearance between the tread and the surrounding mud guard wall of fender 76, wherein the spacing therebetween is typically 2 inches.

These dimensions are of course for a typical automobile. A width of approximately 5 inches and a length of 8 to 9 inches has been found suitable for carrier 16. The spring steel or other material used in forming leaves 61 and 62 of the carrier should provide a spring force at open end 17 such that a pull of approximately 5 to 10 pounds for an average weight car chain will be sufficient to remove the cross chains over boss 71 and out of carrier 16.

To concentrate the spring force at laterally outer portions of the clip opening so as to release each cross chain one at a time and with a clean snap one of leaves 61 and 62 is provided with a central cut-out, herein in the form of cut-out portion 78 in top leaf 62. Cut-out portion 78 extends longitudinally inwardly of the leaf end and at least partially traverses boss 71. Also the cut-out exposes the cross chain immediately adjacent open end 17 for grasping and thus manual access to and for removing the first and second cross chains from the carrier.

At closed end 63 of carrier 16 a pair of longitudinally outwardly extending tabs 81 are provided, including connecting openings 80 therein for receiving connection fittings of crank tool 21.

Crank tool 21 as shown in FIGS. 7 and 8 may be provided by a three-eighths inch rod bent in the shape of first and second right angle sections all in the same plane and joining each other at elbow 82 so as to generally define the shape of a question mark. A first of the right angle sections includes a leg 83 provided with a roller 84 permanently journalled thereon for extending transversely across and being movable relative to the tire tread surface 74 as shown. Another leg 86 of this first right angle section extends from an end leg 83, radially along the sidewall 87 of tire 19 and terminates at elbow 82 approximately at the wheel axle. Leg 86, like leg 83 is provided with a roller 88 permanently journalled thereon, whereby rollers 83 and 88 engage the respective tire surfaces 74 and 87 to facilitate the movement of these legs circumferentially about the tire. A second right angle section of tool 21 provides legs 91 and 92 extending outwardly from elbow 82 to provide a manually engageable lever means in the form of leg 92 and a manually anchored pivot means at leg 91 for applying a rotational force to the first right angle section consisting of legs 83 and 86. Permanently mounted adjacent opposite ends of roller 84 on leg 83 are a pair of "S"hooks 93 having open end portions for detachable connection to openings 80 of carrier tabs 81.

In using the tire chain system of the present invention, a pair of identical tire chains, such as tire chain 10 of FIG. 1 are loaded within a pair of identical spring clip carriers, such as carrier 16. Generally, these chains will be mounted on the rear tires of the vehicle. Each tire chain 10 is stored by placing sparing clip carrier 16 on the ground or any flat surface with the concave surface of bottom leaf 61 up as shown in FIG. 3. With reference to FIG. 2a, end 33 of tire chain 10 is loaded first and in particular detachable cross chain 32 is disposed between the leaves 61 and 62 as shown extending transversely to the longitudinal dimension of the carrier. Thereupon, the permanent cross chains, such as cross chains 13 and 14 are successively inserted into the carrier until they are all disposed in closely pack juxtaposition transverse to the carrier length as shown in FIG. 2b. For storage, the detachable cross chain 24 may be conveniently connected to outer sidewall chain 12 and also inserted in the carrier. As the opposed lateral sides 66 and 67 of carrier 16 are open, the sidewall chains 11 and 12 assume a bunched disposition dangling from the ends of the connecting cross chains. FIGS. 2a, 2b show a carrier loaded with a chain for mounting on a left rear tire (when viewed from the front of the vehicle). For the right rear tire, the chain will be flipped over so that the sidewall chains are fittings will be on proper sides of the tire. With both tire chains loaded in their respective spring clip carriers, they may be stored in the vehicle together with crank tool 21.

ing manner. First, the loaded spring clip is placed in line with tire 19, with the convex surface of top leaf 62 on the ground and open end 17 adjacent tire tread surface 74 as shown in FIG. 6. A first pair of cross chains are removed from the carrier, namely detachable cross chain 24 and a first permanent cross chain. The end of inner sidewall chain 11 including attached cross chain 24 is placed along the inner sidewall of the tire on the ground while the outer sidewall chain end protion including fitting 36 is similarly disposed along the outer sidewall of the tire on the ground. To facilitate displacement of the inner sidewall chain, crank tool 21 is provided at the free end of leg 92 with a flattened and bifurcated portion 96 which may be slipped into the open loop 27 of fitting 23 and pushed around behind the tire 19 until the leg 91 abuts the tread surface 74. This should place cross chain 24 and the associated end of inner sidewall chain 11 toward the front of the tire. These chain elements may be grabbed and drawn forward of the tire so as to pull the loaded carrier 16 up directly behind the tire as shown in FIG. 6. Attaching-detaching fitting 23 and its connected cross chain may now be pulled in front of the tire and attached to outer sidewall chain 12 approximately 4 links from the cross chain at the rear of the tire adjacent carrier 16. This provides for anchoring the end portions of the tire chain 10 adjacent the open end 17 of carrier 16 around the ground engaged portion 18 of the tire. This condition is shown in FIG. 7 with one permanent cross chain 15 and detachable cross chain 24 serving as the anchorage. The free ends of the inner and outer sidewall chains 11 and 12 may be positioned with ring fitting 28 and fitting 36 located to the front of the tire as shown in FIG. 7.

Crank tool 21 is now moved into position and "S" hooks 93 are connected into the openings 80 in tabs 81 and legs 83 and 86 are disposed with their respective rollers engaging the tread surface 74 and sidewall surface 87 of tire 19 as best shown in FIG. 7. With one hand, leg 91 of the crank tool is grasped and held for axial rotation in the hand adjacent the axle of the wheel while leg 92 is used as a lever arm to apply a rotational force at elbow 82 to legs 86 and 83. This manipulation of crank tool 21 impels carrier 16 about the tire circumference with open end 17 trailing. As carrier 16 is slid up and around the tire periphery, each of the cross chains is successively released by reason of the pulling force applied to the carrier against the anchored end of the chain. When the last cross chain is released, spring clip carrier 16 is on the front side of the tire as shown in FIG. 8 with the tire chain circumferentially in place about the tread surface. Carrier 16 and crank tool 22 are now free of the tire chain and may be set to the side.

With referance to FIG. 9, the attaching-detaching fitting 31 at end 33 of chain 10 is now inserted through ring fitting 28 and cross chain 32 is passed therethrough until ring fitting 28 is pulled snug against fitting 34 as shown in FIG. 5. Connection of the opposite ends of inner sidewall chain 11 is now complete. Attaching-detaching fitting 31 is connected to one of the links of outer sidewall chain 12 adjacent fitting 36 and finally standard closing fitting 36 is connected to the terminal link 37 at the opposite end of chain 12 thereby completing the outer sidewall chain.

As shown in FIG. 9, a conventional rubber tension band 97 may be attached to outer sidewall chain 12 for snugging the chain to the tire.

The same installation procedure is followed for mounting the other tire chain.

Chain removal is accomplished by positioning the car so that the standard closing fitting 36 for each of the tire chains can be unfastened. The tensioning band 97 if used is removed and the fitting 36 unlatched. Attaching-detaching fitting 31 is disconnected from outer sidewall chain 12 and the cross chain immediately above the unlatched fitting 36 is pulled outwardly from the tire until cross chain 32 and its associated fitting 31 feed back through ring fitting 28. The chain now may be pulled free of the upper circumferential surface of the tire and the car driven off the chain to complete the removal.

While the invention has been described in connection with an embodiment thereof preferred for a typical passenger automobile, it will be appreciated that changes in the design can be effected for adapting the chain for other vehicles without departing from the scope of the invention.

I claim:

1. A tire chain system for storing and attaching a tire chain having inner and outer sidewall chains connected together at longitudinal intervals by cross chains, comprising:

a carrier for said chain having an open end provided with resilient retainer means for receiving and releasably retaining each of said cross chains;

fitting means affixed to said chains for anchoring sidewall chain end portions adjacent the open end of said carrier to the ground engaged portion of a vehicle tire and for connecting opposite associated ends of said sidewall chains; and tool means for connection to and impelling said carrier circumferentially around the tire tread with the open end of said carrier trailing such that the cross chains are sequentially released at the open end and the tire chain draped in place around the tire circumference, whereby said fitting means are disposed for connecting opposite ends of said sidewall chains.

2. The tire chain system of claim 1 wherein said carrier is of a relatively flat elongated configuration having spaced parallel elongated leaves connected at one of their adjacent ends and being unconnected at their other adjacent ends to define said open end, said leaves furthermore being unconnected along the sides thereof to permit free bunching of said sidewall chains upon receipt of said cross chains in closely packed juxtaposition within said carrier transverse to the longitudinal dimension thereof.

3. The tire chain system of claim 2, said flat elongate carrier being longitudinally curved in an arc such that the exterior surface of the top leaf is longitudinally convex and the exterior surface of the bottom leaf is longitudinally concave, whereby the bottom leaf generally conforms to the outer circumference of the tire tread facilitating sliding engagement thereabout while said top leaf maintains clearance with respect to the surrounding vehicle fender.

4. The tire chain system of claim 1 wherein said carrier is provided by a spring clip integrally formed of an elongate sheet of spring metal folded lengthwise substantially in half and being longitudinally curved to define a pair of spaced parallel leaves connected at one of their ends and being open along the sides and at the other ends to provide said open end, at least one of said leaves adjacent said open end being deformed toward the other wall to constrict the opening thereat and thereby provide said resilient retainer means.

5. The tire chain system of claim 4, said spring clip carrier having a cut out portion in one of said leaves at its open end and extending longitudinally inwardly thereof and at least partially traversing the constriction at said opening to afford manual access to the cross chains held by said carrier.

6. The tire chain system of claim 1, wherein said tool means comprises a crank having a first right angle section adapted to be disposed with one leg lying proximate and transverse to the tire tread and the other leg extending from an end thereof radially along the sidewall to the wheel axle, and a second right angle section connected to said first section at the end thereof adjacent said wheel axle, said second section being manually engagable for applying a rotational force to said first right angle section about a pivotal axis generally aligned with the wheel axle, and means for connecting the leg of the first crank section traversing said tread to said carrier for impelling it circumferentially around said tire.

7. The system of claim 6, the legs of the first right angle section of said crank having roller means engagable with the tread and sidewall of said tire respectively to facilitate movement of said crank relative thereto.

8. The tire chain system of claim 1, said fitting means for ahchoring said sidewall chain end portions comprising a cross chain fitting for detachably connecting a cross chain next to the end portions of said sidewall chains adjacent the open end of said carrier to the outer sidewall chain such that the open end of said carrier may be disposed proximate said ground engaged portion of the tire in line with the tread thereof and the inner and outer sidewall chain end portions arranged to straddle said ground engaged portion for attachment of said cross chain fitting to said outer sidewall chain adjacent said ground engaged portion of said tire and at a region thereof opposite from said carrier.

9. The tire chain system of claim 1, wherein said fitting means comprises a slip ring fixed to one end of the inner sidewall chain and a terminal section of the other end of said inner chain being adapted to provide a cross chain and having a means at the free end thereof attachable to the outer sidewall chain, said terminal section adapted to be passed through said slip ring and connected by said means at the free end thereof to said outer chain so as to secure opposite ends of the inner sidewall chain and serve as a cross chain, said terminal section of said inner sidewall chain being joined to the main section of said inner sidewall chain by a special fitting having a portion of its body dimensioned so that said special fitting will not pass completely through said slip ring, whereby during chain installation said terminal section is passed and pulled through said slip ring until said portion of said special fitting engages said ring and limits further passage therethrough and thus properly positions said terminal section as a cross chain extending transversely to said inner and outer sidewall chains.

10. A method of storing and attaching a tire chain having inner and outer sidewall chains and cross chains connected therebetween at longitudinally spaced locations, the steps comprising:

storing said chain in a carrier having an open end for sequentially receiving and substantially releasing said cross chains in the order of their location on said sidewall chains, disposing the open end of said carrier with the tire chain loaded therein adjacent a ground engaged tread portion of a vehicle tire, anchoring portions of said tire chain adjacent the open end of said carrier to the ground engaged portion of said tire, impelling said carrier circumferentially around the tire tread with the open end trailing so as to dispense the tire chain therefrom and cause it to be draped in place around the tire circumference, and connecting opposite associated ends of said sidewall chains.

11. The method of claim 10, wherein said step of impelling said carrier comprises: attaching a leg of a crank to an end of said carrier opposite said open end and manually manipulating said crank to move the leg in a circumferential path around said tire tread drawing said carrier with it.

* * * * *

UNITED STATES PATENT OFFICE
CERTIFICATE OF CORRECTION

Patent No. 3,794,094　　　　　　　　Dated February 26, 1974

Inventor(s) Joseph L. Wosser, Jr.

It is certified that error appears in the above-identified patent and that said Letters Patent are hereby corrected as shown below:

Column 3, line 14 change "10" to - - 19 - -; line 57 change "ene" to - - end - -. Column 4, line 16 change "inenr" to - - inner - -; line 34 change "31" to - - 32 - -; line 41 change "tha" to - - the - -; line 52 change "sring" to - - spring - -. Column 6, line 35 change "are" to - - and - -; line 40 before "ing" add - - Installation of each tire chain proceeds in the follow- - -. Column 7, line 24 change "22" to - - 21 - -. Column 10, in Claim 10, line 9 of column 10 change "substantially" to - - subsequently - -.

Signed and sealed this 18th day of June 1974.

(SEAL)
Attest:

EDWARD M. FLETCHER, JR.　　　　　　　C. MARSHALL DANN
Attesting Officer　　　　　　　　　　Commissioner of Patents